United States Patent
Chung et al.

(10) Patent No.: US 9,991,712 B1
(45) Date of Patent: Jun. 5, 2018

(54) REACTIVE POWER COMPENSATION APPARATUS AND CONTROL METHOD THEREOF

(71) Applicant: LSIS CO., LTD., Anyang-si, Gyeonggi-do (KR)

(72) Inventors: Yong Ho Chung, Anyang-si (KR); Gum Tae Son, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days. days.

(21) Appl. No.: 15/701,318

(22) Filed: Sep. 11, 2017

(30) Foreign Application Priority Data

Dec. 6, 2016 (KR) ........................ 10-2016-0164802

(51) Int. Cl.
*H02J 3/18* (2006.01)
*H02M 1/088* (2006.01)
*H02M 1/00* (2006.01)

(52) U.S. Cl.
CPC ........... *H02J 3/1842* (2013.01); *H02M 1/088* (2013.01); *H02M 2001/0054* (2013.01)

(58) Field of Classification Search
CPC ..... H02M 1/42; H02M 1/4216; H02M 1/4233
USPC .................................. 323/205, 207, 210, 211
See application file for complete search history.

(56) References Cited

U.S. PATENT DOCUMENTS

| 5,642,275 | A | 6/1997 | Peng et al. | |
|---|---|---|---|---|
| 5,986,909 | A | 11/1999 | Hammond | |
| 6,411,065 | B1* | 6/2002 | Underwood | H02J 3/38 322/20 |
| 2003/0128563 | A1* | 7/2003 | Rojas Romero | H02M 1/4216 363/89 |
| 2010/0220499 | A1* | 9/2010 | Haj-Maharsi | H02M 1/4216 363/13 |
| 2012/0280569 | A1* | 11/2012 | Alam | H02J 3/32 307/60 |
| 2014/0078797 | A1 | 3/2014 | Mihalache | |
| 2015/0365011 | A1 | 12/2015 | Ilves | |
| 2017/0366082 | A1* | 12/2017 | Liu | H02P 7/04 |

FOREIGN PATENT DOCUMENTS

EP 2905889 A1 8/2015
KR 20120002787 1/2012

OTHER PUBLICATIONS

European Search Report for related European Application No. 17179557.8; report dated Feb. 1, 2018; (8 pages).

* cited by examiner

*Primary Examiner* — Jeffrey Sterrett
(74) *Attorney, Agent, or Firm* — K&L Gates LLP

(57) ABSTRACT

A reactive power compensation apparatus includes one or more phase clusters each comprising a plurality of cells, and a controller controlling the one or more phase clusters. When at least one cell in a specific phase cluster among the one or more phase clusters is faulty, the controller controls a voltage of each cell in each of the remaining phase clusters except for the specific phase cluster to be controlled, using a modulation index.

20 Claims, 10 Drawing Sheets

US 9,991,712 B1

REACTIVE POWER COMPENSATION APPARATUS AND CONTROL METHOD THEREOF

CROSS-REFERENCE TO RELATED APPLICATIONS

Pursuant to 35 U.S.C. § 119(a), this application claims benefit of earlier filing date and right of priority to Korean Patent Application No. 10-2016-0164802, filed on Dec. 6, 2016, the contents of which are all hereby incorporated by reference herein in its entirety.

BACKGROUND

The disclosure relates to a reactive power compensation apparatus and a control method thereof.

As industries are developed and population increases, power demand rapidly increases. On the other hand, there is a limit to power production.

Accordingly, power systems for stably power generated from production areas to demand areas without loss gradually become important.

The necessity of a Flexible AC Transmission System (FACTS) for improving power flow, voltage of the power system, and stability comes to the fore. In the FACTS, a STATic synchronous COMpensator (STATCOM) that is one of third-generation reactive power compensation apparatuses is synchronized with a power system to compensate for reactive power required by the power system.

FIG. 1 illustrates a general power system.

As shown in FIG. 1, the general power system 10 may include a power generation source 20, a power system 30, a load 40, and a plurality of reactive power compensation apparatuses 50.

The power generation source 20 refers to a place or facility that generates power, and may be understood as a producer that generates power.

The power system 30 may refer to an integrated facility including power lines, steel transmission towers, arresters, insulators, and the like, which allow power generated from the power generation source 20 to be transmitted to the load 40.

The load 40 refers to a place or facility that consumes power generated from the power generation source 20, and may be understood as a consumer that consumes power.

The reactive power compensation apparatus 50 is a STATCOM, and is associated with the power system 30 to compensate for reactive power flowing through the power system 30 when the reactive power is insufficient.

The reactive power compensation apparatus 50 includes a converter capable of converting AC power into DC power or converting DC power into AC power.

The converter includes a cluster including a plurality of cells connected in series for each of three phases.

FIG. 2A is a circuit diagram of a converter having a star connection topology, and FIG. 2B is a circuit diagram of a converter having a delta connection topology.

As shown in FIGS. 2A and 2B, each converter has a structure in which a plurality of cells 54 are connected in series in each of three-phase clusters 52.

Each cell is provided with a bypass switch, so that, although a corresponding cell is faulty, the corresponding cell is bypassed by the bypass switch. Thus, the remaining cells except for the faulty cell are normally available, and accordingly, the converter can be normally operated.

As shown in FIG. 3A, when numbers of cells included in the respective phases are equal to one another, voltages of the respective phases, i.e., total voltages of the cells included in the respective phases are equal to one another, and thus the voltages of the respective phases make balance. Hence, the voltages of the respective phases can be equally controlled.

However, as shown in FIG. 3B, when some cells among the cells included in a specific phase, e.g., phase are faulty or eliminated, a total voltage of cells included in the phase c becomes smaller than that of cells included in phase a or b. Hence, voltages of the respective phases are unbalanced, and therefore, it is difficult to equally control the voltages of the respective phases.

SUMMARY

Accordingly, an object of the disclosure is to address the above-noted and other problems.

Another object of the disclosure is to provide a reactive power compensation apparatus and a control method thereof, which enables voltages of respective phases to be equally controlled even when a specific cell included in each phase cluster is faulty.

Another object of the disclosure is to provide a reactive power compensation apparatus and a control method thereof, which can reduce switching loss of cells included in each phase cluster.

In one embodiment, there is provided a reactive power compensation apparatus including: one or more phase clusters each comprising a plurality of cells; and a controller configured to control the one or more phase clusters, wherein, when at least one cell in a specific phase cluster among the one or more phase clusters is faulty, the controller controls a voltage of each cell in each of the remaining phase clusters except for the specific phase cluster to be adjusted, using a modulation index.

In another embodiment, there is provided a method for controlling a reactive power compensation apparatus, the method including: when at least one cell in a specific phase cluster among one or more phase clusters each comprising a plurality of cells is faulty, controlling a voltage of each cell in each of the remaining phase clusters except for the specific phase cluster, using a modulation index; and generating a control signal for controlling the one or more phase clusters, using the voltage of each cell in the specific phase cluster and the controlled voltage of each cell in each of the remaining clusters.

The reactive power compensation apparatus and the control method thereof according to the disclosure have advantages as follows.

According to at least one of the embodiments, spare cells are provided in each phase cluster, so that, although cells are faulty as many as the number of the spare cells, voltage balance between the respective phase clusters can be maintained, thereby improving the reliability of a product.

According to at least one of the embodiments, switching loss of cells included in each phase cluster is minimized, so that the lifespan of the phase clusters can be extended.

Further scope of applicability of the disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the disclosure, that which is well-known to one of ordinary skill in the relevant art has generally been omitted for the sake of brevity. The accompanying drawings are used to help easily understand various technical features and it should be understood that the embodiments are not limited by the accompanying drawings. As such, the disclosure should be construed to extend to any alterations, equivalents and substitutes in addition to those which are particularly set out in the accompanying drawings.

Figure 4:
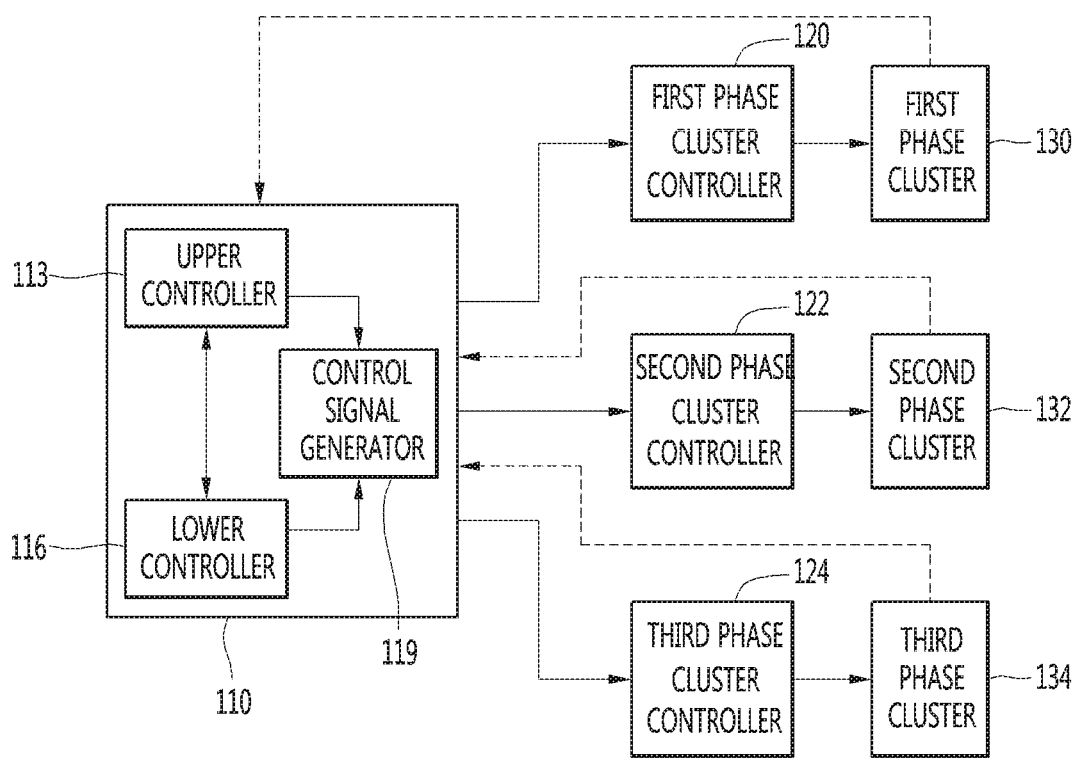
FIG. 4 is a block diagram illustrating a reactive power compensation apparatus according to an embodiment.

FIG. 4 is a block diagram illustrating a reactive power compensation apparatus according to an embodiment.

Referring to FIG. 4, the reactive power compensation apparatus 100 according to the embodiment may include a controller 110, first to third phase cluster controllers 120, 122, and 124, and first to third phase clusters 130, 132, and 134.

Figure 5:
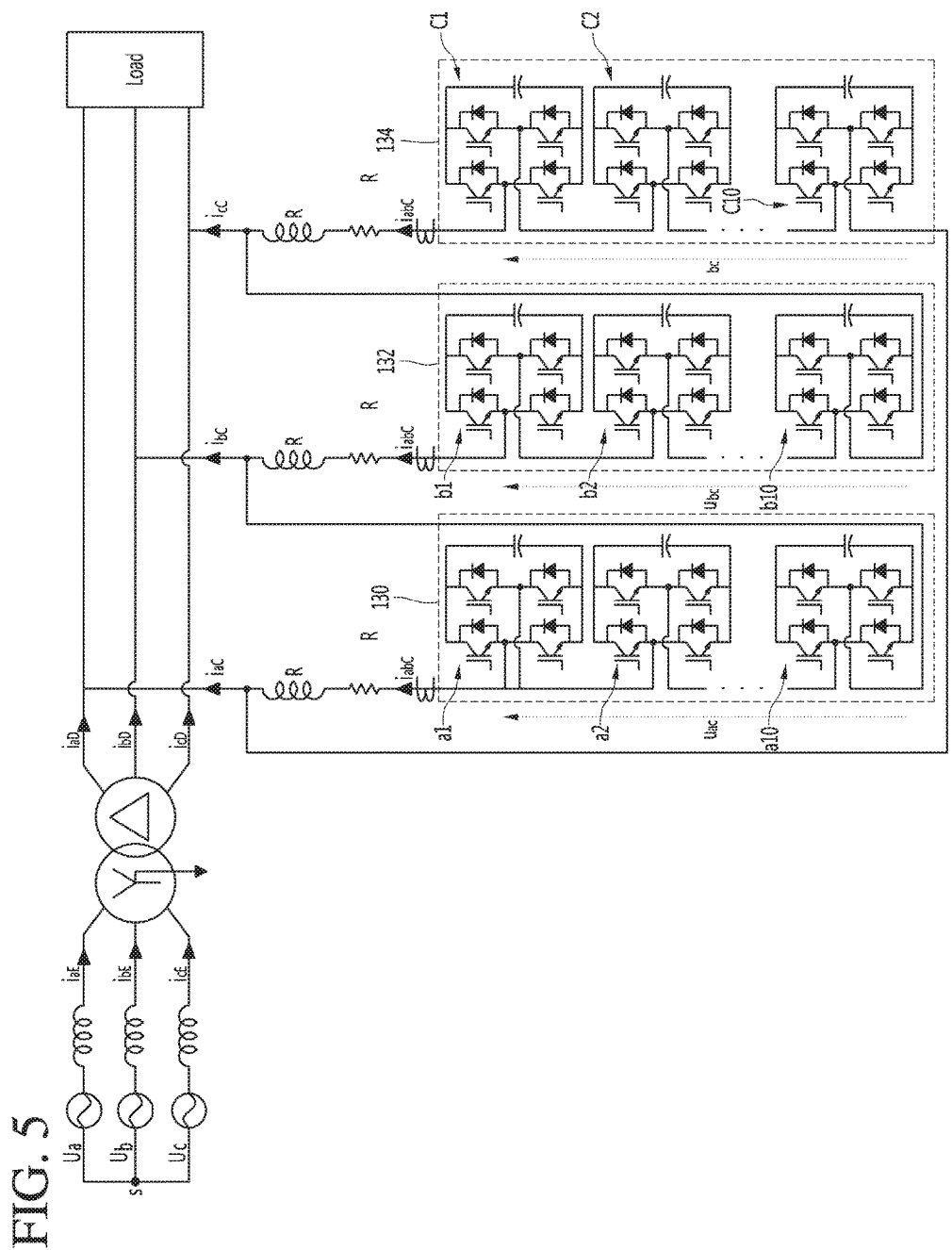
FIG. 5 is a circuit diagram having a delta connection topology of the reactive power compensation apparatus according to an embodiment.

The first to third phase clusters 130, 132, and 134 will be described with reference to FIGS. 5 and 6.

The first phase cluster 130 may include first to (n+2)th cells a1 to a(n+2). The second phase cluster 132 may include first to (n+2)th cells b1 to b(n+2). The third phase cluster 134 may include first to (n+2)th cells c1 to c(n+2).

The number of cells included in each of the phase clusters 130, 132, and 134 may be (n+2).

Figure 1:
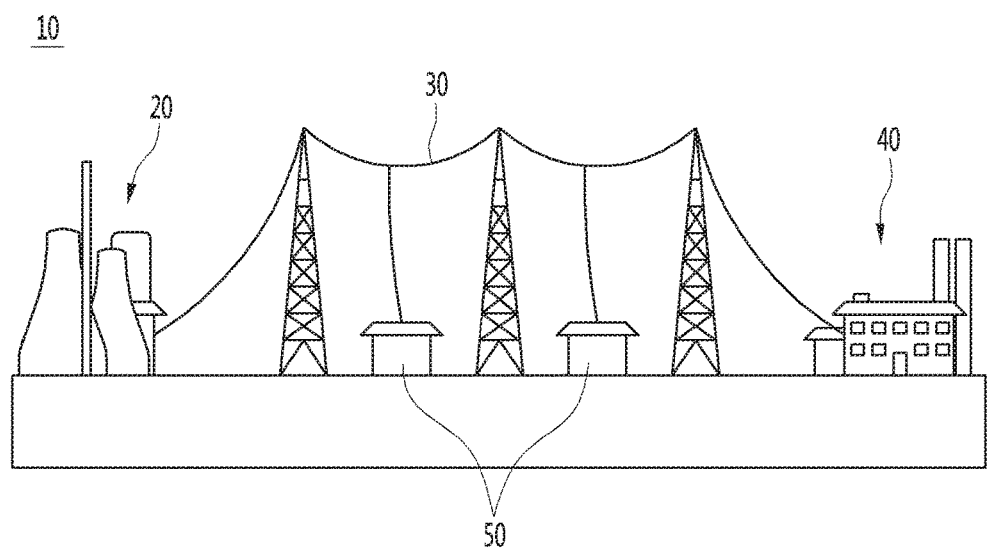
FIG. 1 illustrates a general power system.
Figure 2A:
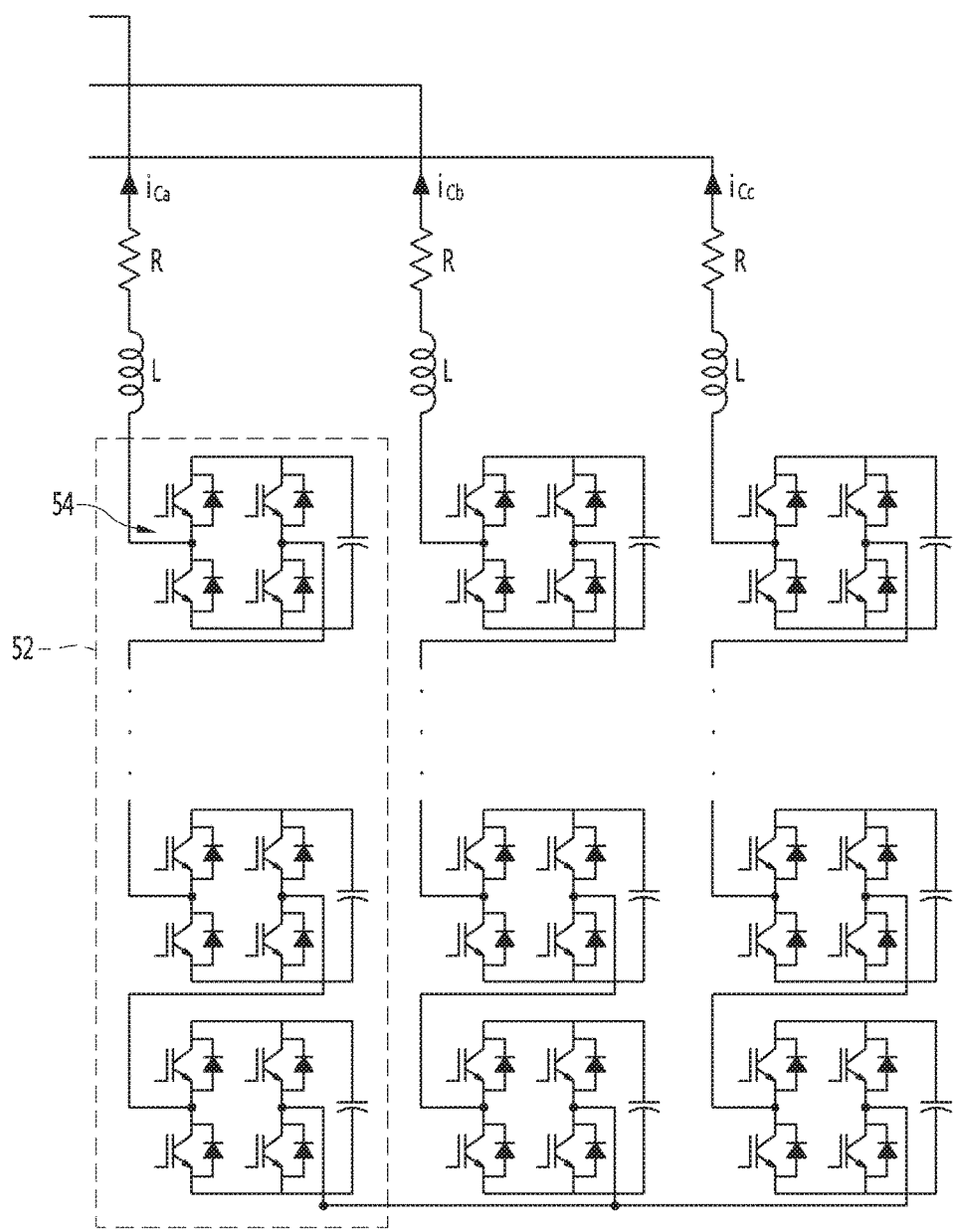
FIGS. 2A and 2B are circuit diagrams illustrating Y connection and delta connection of the general reactive power compensation apparatus.
Figure 2B:
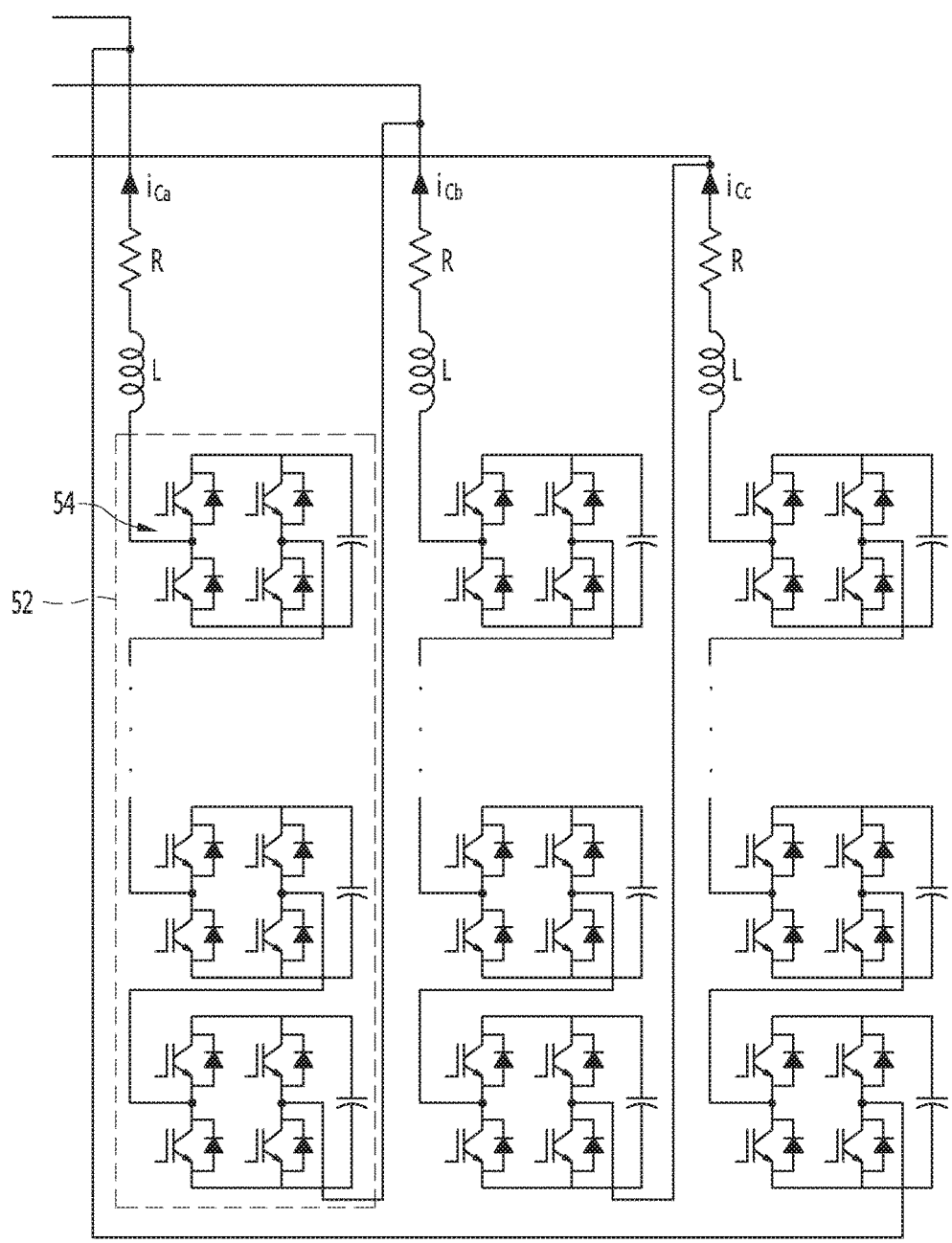
Figure 3A:
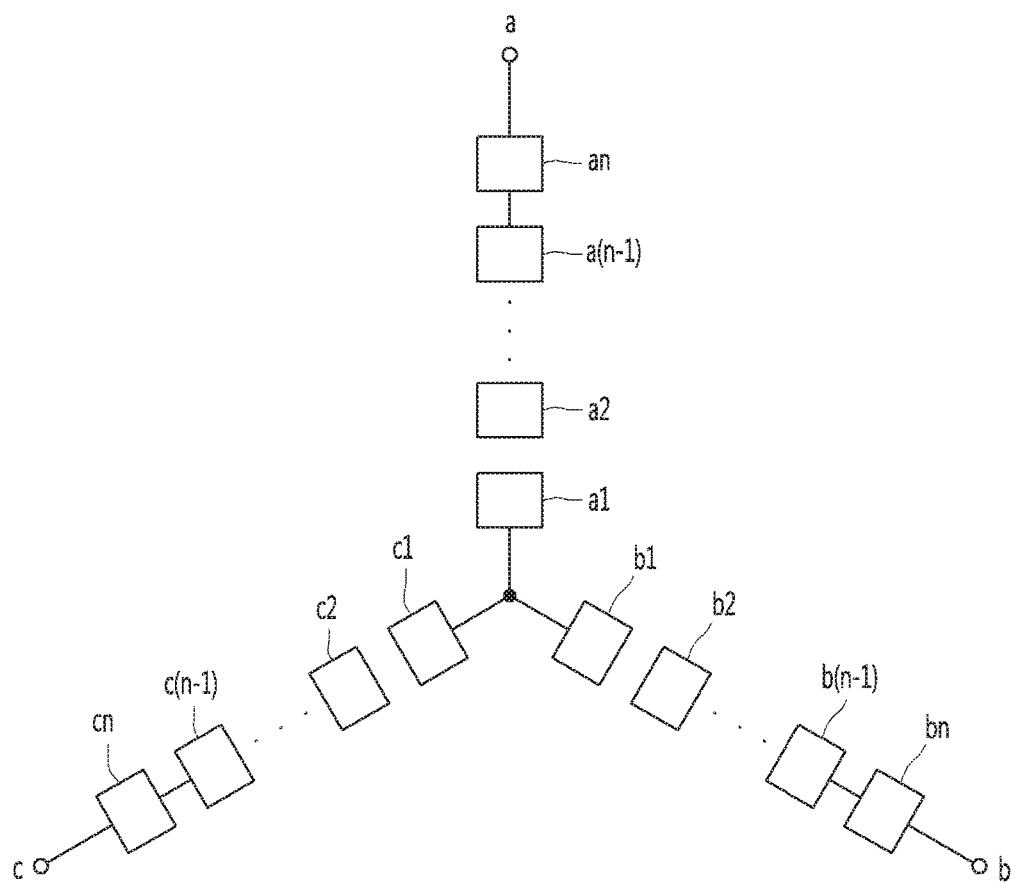
FIGS. 3A and 3B are views illustrating a relationship among voltages of respective phases.
Figure 3B:
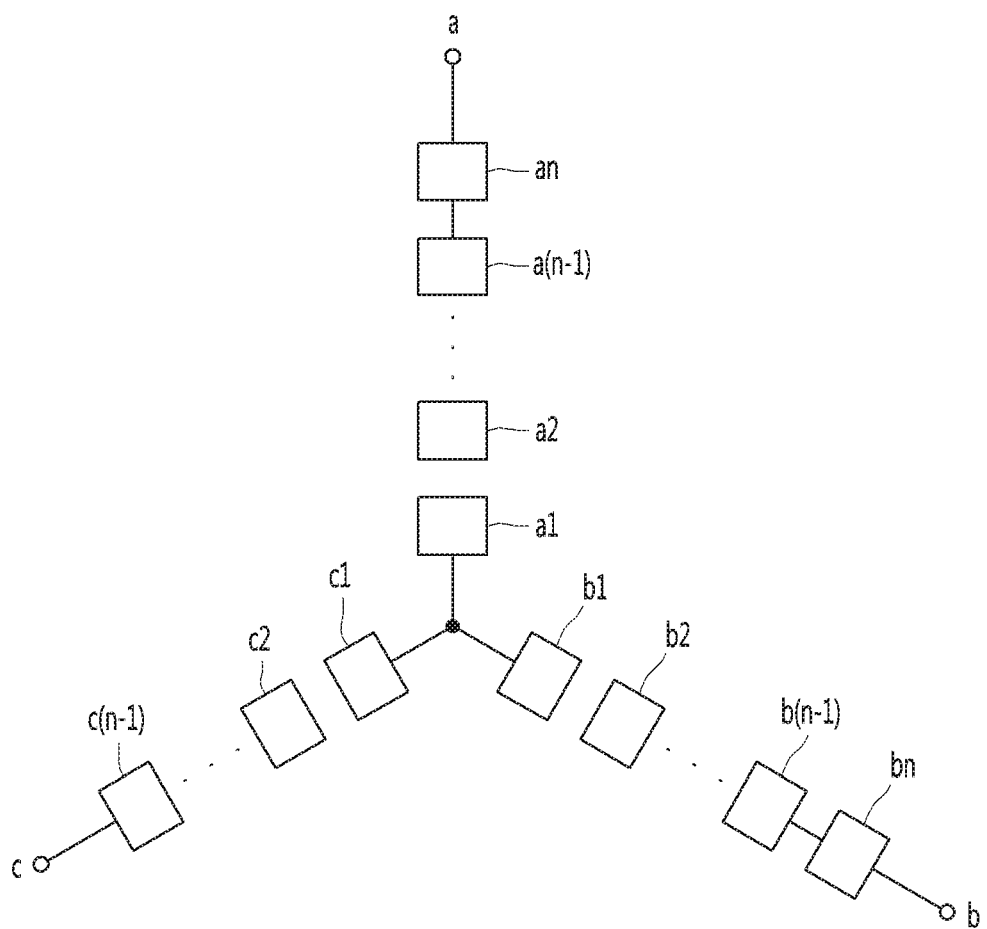
Figure 6:
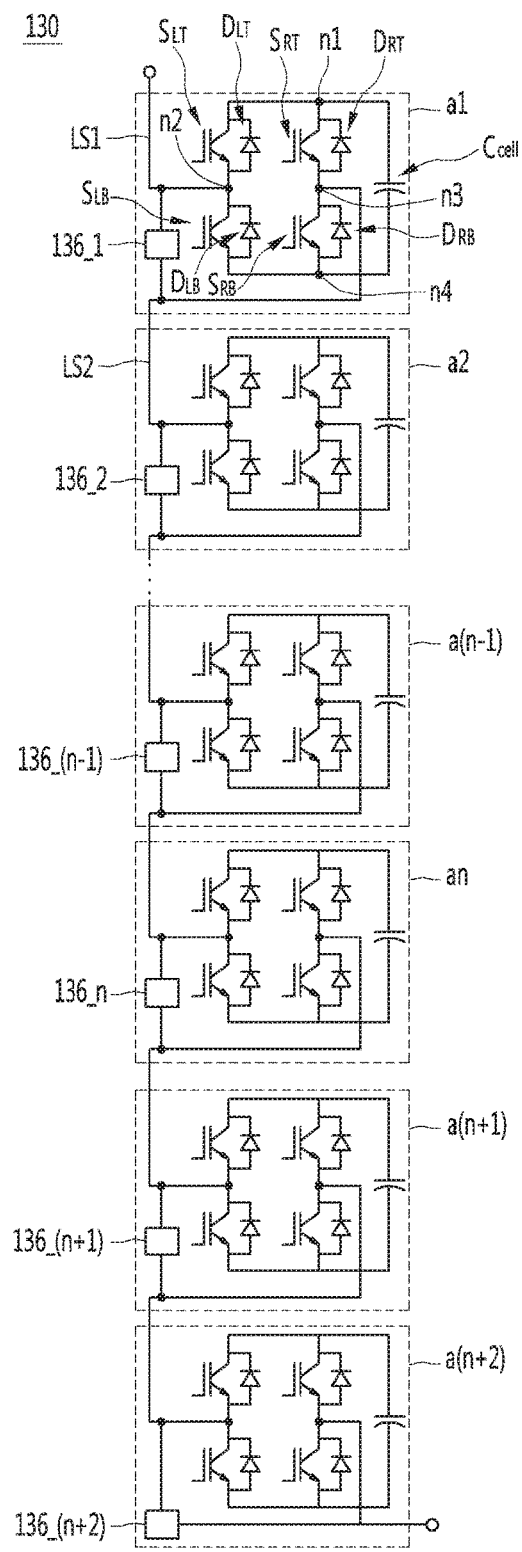
FIG. 6 is a circuit diagram illustrating a first phase cluster.

Although FIG. 6 illustrates the first phase cluster 130 for convenience of description, other phase clusters, i.e., the second phase cluster 132 and the third phase cluster 134 have the same structure as the first phase cluster 230 shown in FIG. 1.

As shown in FIG. 6, the first phase cluster 130 may include a plurality of cells a1 to a(n+2) connected in series.

Each of the cells a1 to a(n+2) may include four switches $S_{LT}$, $S_{LB}$, $S_{RT}$, and $S_{RB}$, four diodes $D_{LT}$, $D_{LB}$, $D_{RT}$, and $D_{RB}$, and a capacitor $C_{cell}$.

First to fourth switches $S_{LT}$, $S_{LB}$, $S_{RT}$, and $S_{RB}$ may be Insulated Gate Bipolar mode Transistors (IGBTs), but the embodiments are not limited thereto.

The first to fourth switches $S_{LT}$, $S_{LB}$, $S_{RT}$, and $S_{RB}$ may be configured of a full bridge type, but the embodiments are not limited thereto.

Specifically, the first and second switches $S_{LT}$ and $S_{LB}$ may be connected in series between a first node n1 and a fourth node n4. That is, the first switch $S_{LT}$ may be connected between the first node n1 and a second node n2, and the second switch $S_{LB}$ may be connected between the second node n2 and the fourth node n4. Similarly, a first diode $D_{LT}$ may be connected between the first node n1 and the second node n2, and a second diode $D_{LB}$ may be connected between the second node n2 and the fourth node n4.

In addition, the third and fourth switches $S_{RT}$ and $S_{RB}$ may be connected in series between the first node n1 and the fourth node n4. That is, the third switch $S_{RT}$ may be connected between the first node n1 and a third node n3, and the fourth switch $S_{RB}$ may be connected between the third node n3 and the fourth node n4. Similarly, a third diode $D_{RT}$ may be connected between the first node n1 and the third node n3, and a fourth diode $D_{RB}$ may be connected between the third node n3 and the fourth node n4.

A first switch pair configured with the first and second switches $S_{LT}$ and $S_{LB}$ and a second switch pair configured with the third and fourth switches $S_{RT}$ and $S_{RB}$ may be connected in parallel to each other between the first node n1 and the fourth node n4.

The capacitor $C_{cell}$ may be provided between the first node n1 and the fourth node n4. That is, one end of the capacitor $C_{cell}$ may be connected to the first node n1, and the other end of the capacitor $C_{cell}$ may be connected to the fourth node n4. The capacitor $C_{cell}$ may also be connected in parallel to the first switch pair and/or the second switch pair.

A first line LS1 connected to the second node n2 may be connected to a third node n3 of a previous cell, and a second line LS2 connected to the third node n3 may be connected to a second node n2 of a next cell.

A bypass switch 136_1 to 136_(n+2) may be provided between the first line LS1 and the second line LS2. That is, one end of the bypass switch 136_1 to 136_(n+2) may be connected to one area of the first line LS1, and the other end of the bypass switch 136_1 to 136_(n+2) may be connected to one area of the second line LS2.

The structure of the cells a1 to a(n+2) of the first phase cluster 130 may be identically applied to that of the cells b1 to b(n+2) or c1 to c(n+2) of each of the second phase cluster 132 and the third phase cluster 134.

Therefore, reactive power of a power system may be compensated for by switching control of the cells a1 to a(n+2), b1 to b(n+2), and c1 to c(n+2) of the respective first to third phase clusters 130, 132, and 134. That is, in order to compensate for the reactive power of the power system, when the reactive power of the power system is lead reactive power in which the phase of current leads the phase of voltage, the cells a1 to a(n+2), b1 to b(n+2), and c1 to c(n+2) of the respective first to third phase clusters 130, 132, and 134 may be switching-controlled such that the phase of current is delayed. When the reactive power of the power system is lag reactive power in which the phase of current lags behind the phase of voltage, the cells a1 to a(n+2), b1 to b(n+2), and c1 to c(n+2) of the respective first to third phase clusters 130, 132, and 134 may be switching-controlled such that the phase of current is put forward.

The first to fourth diodes $D_{LT}$, $D_{LB}$, $D_{RT}$, and $D_{RB}$ may prevent reverse current from flowing through the respective first to fourth switches $S_{LT}$, $S_{LB}$, $S_{RT}$, and $S_{RB}$.

Alternatively, the first to fourth diodes $D_{LT}$, $D_{LB}$, $D_{RT}$, and $D_{RB}$ may allow a voltage of a capacitor $C_{cell}$ of a specific cell not to be used by forming a current path that does not pass through the capacitor $C_{cell}$. That is, the first to fourth diodes $D_{LT}$, $D_{LB}$, $D_{RT}$, and $D_{RB}$ may allow the specific cell not to be used. For example, when only the third switch $S_{RT}$ of the first cell a1 is turned on, a current path formed by the first line LS1, the first diode $D_{LT}$, the third switch $S_{RT}$, and the second line SL2 may be formed. In this case, the voltage of the capacitor $C_{cell}$ is not used to generate an output voltage of the first phase cluster 130.

The capacitor $C_{cell}$ may allow a voltage corresponding to a defined capacity to be maximally charged therein. Therefore, a corresponding capacity $C_{cell}$ may be charged toward a maximum voltage or discharged toward 0V.

When a corresponding cell is faulty, the bypass switch 136_1 to 136_(n+2) may allow the corresponding cell not to be used. For example, when the first cell a1 is faulty, the bypass switch 136_1 to 136_(n+2) connected between the first line LS1 and the second line LS2 may be turned on, so that the first line LS1 and the second line LS2 are connected to be short-circuited. Therefore, current flowing in the first line LS1 does not flows through the elements of the first cell a1, i.e., the switches, the diodes, and the capacitor, but flows in the second cell a2 through the second line LS2. When a specific cell of a corresponding phase cluster is faulty in such a manner, the bypass switch 136_1 to 136_(n+2) provided in a corresponding cell may be turned on such that the flow of current is bypassed from a previous cell to a next cell.

The first to third phase cluster controllers 120, 122, and 124 may control the first to third phase clusters 130, 132, and 134, respectively.

The first to third phase cluster controllers 120, 122, and 124 may generate first to third switching signals for controlling each of the cells a1 to a(n+2), b1 to b(n+2), and c1 to c(n+2) in the first to third phase clusters 130, 132, and 134, respectively.

Specifically, the first phase cluster controller 120 may generate a first switching signal for controlling each of the cells a1 to a(n+2) in the first phase cluster 130. The second phase cluster controller 122 may generate a second switching signal for controlling each of the cells b1 to b(n+2) in the second phase cluster 132. The third phase cluster controller 124 may generate a third switching signal for controlling each of the cells c1 to c(n+2) in the third phase cluster 134.

The first to third phase cluster controllers 120, 122, and 124 may generate the first to third switching signals, based on a command value and/or a control signal, provided from the controller 110.

The controller 110 may control the first to third phase cluster controllers 120, 122, and 124.

Specifically, the controller 110 may generate a command value and/or a control signal, based on power situation information acquired from the power system and/or status information of the respective first to third phase clusters 130, 132, and 134 and status information of the respective cells a1 to a(n+2), b1 to b(n+2) or c1 to c(n+2) of each phase cluster 130, 132, or 134, and transmit the generated command value and/or control signal to the first to third phase cluster controller 120, 122, and 124.

The power situation information may be voltage and/or current information.

The status information of the respective first to third phase clusters 130, 132, and 134 and the status information of the respective cells a1 to a(n+2), b1 to b(n+2) or c1 to c(n+2) of each phase cluster 130, 132, or 134 may be provided from each phase cluster 130, 132, and 134 and/or the cells a(n+2), b1 to b(n+2) or c1 to c(n+2) in each phase cluster 130, 132, and 134 through wired or wireless communication.

The wired or wireless communication may be performed between the controller 110 and the first to third phase cluster controller 120, 122, and 124.

The first to third phase cluster controller 120, 122, and 124 and the first to third phase clusters 130, 132, and 134 may perform the wired or wireless communication, but the embodiments are not limited thereto.

The controller 110 may include an upper controller 113, a lower controller 116, and a control signal generator 119.

The upper controller 113 may be referred to as a first controller, and the lower controller 116 may be referred to as a second controller. Alternatively, the lower controller 116 may be referred to as a first controller, and the upper controller 113 may be referred to as a second controller.

For example, the upper controller 113 may generate a cluster voltage balancing control signal for controlling voltage balancing between the first to third phase clusters 130, 132, and 134. The cluster voltage balancing control signal may control the voltage balancing between the first to third phase clusters 130, 132, and 134. In other words, a voltage of the first phase cluster 130, a voltage of the second phase cluster 132, and a voltage of the third phase cluster 134 may be equalized by the cluster voltage balancing control signal.

The cluster voltage balancing control signal may be referred to as a reference signal.

For example, the lower controller 116 may generate a cell voltage balancing control signal for controlling voltage balancing between the cells a1 to a(n+2), b1 to b(n+2), and c1 to c(n+2) of the respective first to third phase clusters 130, 132, and 134.

The cell voltage balancing control signal may include first to third cell voltage balancing control signals corresponding to the respective first to third phase clusters 130, 132, and 134, but the embodiments are not limited thereto.

For example, the first cell voltage balancing control signal may control voltage balancing between the cells a1 to a(n+2) in the first phase cluster 130. In other words, voltages between the cells a1 to a(n+2) in the first phase cluster 130 may be equalized by the first cell voltage balancing control signal.

For example, the second cell voltage balancing control signal may control voltage balancing between the cells b1 to b(n+2) in the second phase cluster 132. In other words, voltages between the cells b1 to b(n+2) in the second phase cluster 132 may be equalized by the second cell voltage balancing control signal.

For example, the third cell voltage balancing control signal may control voltage balancing between the cells c1 to c(n+2) in the third phase cluster 134. In other words, voltages between the cells c1 to c(n+2) in the third phase cluster 134 may be equalized by the third cell voltage balancing control signal.

The control signal generator 119 may generate a command value or control signal, based on the cluster voltage balancing control signal input from the upper controller 113 and the first to third cell voltage balancing control signals input from the lower controller 116. The command value or control signal may be transmitted to the first to third phase cluster controllers 120, 122, and 124, so that first to third switching signals for controlling the first to third phase cluster 130, 132, and 134 are generated by the first to third phase cluster controllers 120, 122, and 124, respectively. Different command values or control signals may be transmitted from the control signal generator 119 to the first to third phase cluster controllers 120, 122, and 124, but the embodiments are not limited thereto.

The disclosure may provide a technical spirit in which spare cells are provided in each phase cluster 130, 132, or 134, so that, although cells are faulty as many as the number of the spare cells, voltage balance between the respective phase clusters 130, 132, and 134 can be maintained, thereby improving the reliability of a product.

Further, the disclosure may provide a technical spirit in which switching loss of the cells included in each phase cluster 130, 132, or 134 is minimized, so that the lifespan of the first to third phase clusters 130, 132, and 134 can be extended.

In the reactive power compensation apparatus 100 of the disclosure, n cells a1 to an, b1 to bn, or c1 to cn per each phase cluster 130, 132, or 134 may be required so as to generate a peak value (Vac of the following Equation 2) of an operable AC voltage.

However, in the disclosure, spare cells exceeding the n cells a1 to an, b1 to bn, or c1 to cn per each phase cluster 130, 132, or 134 may be further provided to prepare for a fault of cells.

When the spare cells exceeding the n cells a1 to an, b1 to bn, or c1 to cn is designated as α, a total number Ncell per each phase cluster 130, 132, or 134 may be represented by the following equation.

$$N\text{cell} = n + \alpha \quad \text{[Equation 1]}$$

Hereinafter, as an example related to the disclosure, it is assumed that n is 8, α is 2, the maximum voltage of each cell is 1V, and the peak value of an AC voltage is 8V.

The maximum voltage of each cell may be a maximum voltage charged in the capacitor of each cell.

Here, two spare cells α may mean that, although a maximum of 2 cells are faulty, each phase cluster 130, 132, or 134 can be switching-controlled in the state in which the voltage balance between the respective phase clusters 130, 132, and 134 is maintained. If three cells are faulty, each phase cluster 130, 132, or 134 is no longer switching-controlled, and therefore, the reactive power compensation apparatus 100 cannot perform its original function.

If it is predicted that two or more cells will be faulty, it may be designed that α is 2 or more.

At a normal time, i.e., when any cell is not faulty in each phase cluster 130, 132, or 134, the waveform of an AC voltage ranging from +8V to −8V may be periodically generated using 10 cells.

The controller 110 controls an output voltage of each phase cluster 130, 132, or 134 by detecting a voltage charged in the capacitor $C_{cell}$ of each cell and determining cells to be turned on/off based on the detected voltage.

Here, the cell to be turned on may refer to a cell in which a voltage charged in the capacitor of the corresponding cell is used to generate an output voltage of a corresponding phase cluster 130, 132, or 134.

The cell to be turned off may refer to a cell in which a voltage charged in the capacitor of the corresponding cell is not used to generate an output voltage of a corresponding phase cluster 130, 132, or 134.

For example, if 10 cells are all charged with 1V when an output voltage of 8V is to be generated, the output voltage may be controlled such that, among the 10 cells, 8 cells are turned on and 2 cells are turned off. Therefore, the output voltage of 8V may be generated by the 8 cells to be turned on.

For example, if each of the 10 cells is charged with 0.8V when an output voltage of 4V is to be generated, the output voltage may be controlled such that, among the 10 cells, 5 cells are turned on and 5 cells are turned off. Thus, the output voltage of 4V may be generated by the 5 cells to be turned on.

The examples are derived from the assumption that all of the 10 cells have the same voltage. However, since voltages of the respective cells are continuously changed and different from one another, it is required to precisely control the cells to be turned on/off.

In this case, when all of the 10 cells are not selected, e.g., when 5 cells are selected, the corresponding 5 cells are not equally selected but may be variably selected.

Here, the selection of a cell may mean that the corresponding cell operates to be turned on, and the non-selection of a cell may mean that the corresponding cell operates to be turned off.

For example, when five cells are selected from 10 cells in each phase, first to fifth cells may be selected in some cases, and second, fourth, sixth, eighth, and tenth cells may be selected in some cases.

Therefore, at the normal time, an AC voltage may be generated using the same number of cells among the cells a1 to a(n+2), b1 to b(n+2), or c1 to c(n+2) included in each phase cluster 130, 132, or 134 for each phase, i.e., 10 cells per each phase cluster 130, 132, or 134. Thus, voltage equalization control can be performed under the same condition for each phase.

The normal time may be a time when any cell in each phase cluster 130, 132, or 134 is not faulty.

If one cell among the cells included in a specific phase, e.g., the second phase cluster 132 is faulty, (n+1) cells b1 to b(n+1) included in the second phase cluster 132 may be used to generate an AC voltage. On the other hand, (n+2) cells a1 to a(n+2) or c1 to c(n+2) included in the first phase cluster 130 or the third phase cluster 134 may be used to generate an AC voltage.

For example, when the third cell b3 included in the second phase cluster 132 is faulty, the third cell b3 of the second phase cluster 132 is no longer used. Accordingly, the bypass switch 136_3 connected to the third cell b3 is turned on so that the third cell b3 is bypassed. In this case, only 9 cells b1, b2, and b4 to b9 may be used in the second phase cluster 132. On the other hand, 10 cells a1 to a10 or c1 to c10 may be used in the first phase cluster 130 or the third phase cluster 134.

Therefore, the output voltage of the second phase cluster 132 may be generated using the nine cells b1, b2, and b4 to b9. On the other hand, the output voltage of the first phase cluster 130 or the third phase cluster 134 may be generated using the 10 cells a1 to a10 or c1 to c10.

In the disclosure, a modulation index of a phase cluster in which no fault occurs, e.g., the first phase cluster 130 or the third phase cluster 134 is controlled to be equal to that of a phase cluster in which fault occurs, e.g., the second phase cluster 132, using a modulation index (MI), thereby reducing switching loss of each cell.

The modulation index may be calculated by the following equation in the controller 110.

$$MI = Vac/Vdc \quad \text{[Equation 2]}$$

Vac is a peak voltage operable in the reactive power compensation apparatus 100, and may be dependent on a voltage of the power system. That is, a maximum peak voltage operable in the reactive power compensation apparatus 100 may be calculated by considering the voltage of the power system, and a number of cells a1 to a(n+2), b1 to b(n+2), or c1 to c(n+2) of each phase cluster 130, 132, or 134 may be determined to generate a voltage greater than the maximum peak voltage. Therefore, the turn-on/off of each of the cells a1 to a(n+2), b1 to b(n+2), and c1 to c(n+2) may be controlled so as to generate an output voltage within the maximum peak voltage using the determined number of cells a1 to a(n+2), b1 to b(n+2), or c1 to c(n+2) of each phase cluster 130, 132, or 134.

For example, when Vac is 8V and the maximum voltage per cell included in each phase cluster 130, 132, or 134 is 1V, 8 or more cells may be provided in each phase cluster 130, 132, or 134. In FIG. 5, when n is 8 (a1 to a8, b1 to b8, or c1 to c8), the total number of cells included in each phase cluster 130, 132, or 134, including 2 spare cells, may be 10 a1 to a10, b1 to b10, or c1 to c10.

Vdc may be a sum of maximum voltages of available cells among the cells a1 to a(n+2), b1 to b(n+2), or c1 to c(n+2) included in each phase cluster 130, 132, or 134. A cell of which fault does not occur may be defined as an available cell, and a cell of which fault occurs may be defined as an unavailable cell. The cell of which fault occurs may be cell bypassed as the bypass switch 136_1 to 136_(n+2) is turned on.

For example, if the maximum voltage per cell included in each phase cluster 130, 132, or 134 is 1V, when 10 cells are provided in each phase cluster 130, 132, or 134 and all of the cells are available cells, Vdc may be 10V. At the normal time, cells a1 to a10, b1 to b10, or c1 to c10 are available for each phase cluster 130, 132, or 134. Therefore, each of first to third modulation indexes MIa, MIb, and MIc is 8/10=0.8, and the first to third modulation indexes MIa, MIb, and MIc of the respective phase clusters 130, 132, and 134 may be equal to one another.

The first modulation index may be a value calculated with respect to the first phase cluster 130, and the second modulation index may be a value calculated with respect to the second phase cluster 132, and the third modulation index may be a value calculated with respect to the third phase cluster 134.

On the other hand, at an abnormal time, i.e., when at least one specific cell among cells included in a specific phase cluster is faulty, a modulation index of the specific phase cluster is different from that of the specific phase cluster at the normal time.

For example, when the third cell in the second phase cluster 132 is faulty, and any cell is not faulty in both of the first phase cluster 130 and the third phase cluster 134, each of the first modulation index MIa and the third modulation index MIc may be 0.8 (=8/10), and the second modulation index MIb may be 0.89 (=8/9).

Therefore, the second modulation index of the second phase cluster 132 is increased as compared with the first and third modulation indexes of the first and third phase clusters 130 and 134.

That the modulation index is increased may mean that the control stability of a system becomes poor. In this case, the controller 110 may control cell voltages of the first phase cluster 130 and the third phase cluster 134 such that the first modulation index of the first phase cluster 130 and the third modulation index of the third phase cluster 134 can be equal to the second modulation index of the second phase cluster 132 of which modulation index is changed as the cell is faulty.

The controller 110 may control a voltage of each of available cells of a phase cluster, of which e fault does not occur, to be smaller than voltage of each of available cells of a phase cluster, of which fault occurs, using the first to third modulation indexes.

That is, the modulation index of the second phase cluster 132 is greatest among the modulation indexes of the first to third phase clusters 130, 132, and 134. In this case, nine cells are available among the 10 cells of the second phase cluster 132 in which one cell is faulty. On the other hand, all of the 10 cells are available in another phase cluster, i.e., each of the first phase cluster 130 and the third phase cluster 134.

Therefore, like the normal time, the voltage of each of the cells included in the second phase cluster 132 is available as 1V that is a first voltage. However, the voltage of each of the cells included in the first phase cluster 130 and the third phase cluster 134 may be decreased as a second voltage smaller than the first voltage.

The second phase cluster 132 generates the peak value of an AC voltage using the cells having the first voltage, and each of the first phase cluster 130 and the third phase cluster 134 generates the peak value of an AC voltage using the cells having the second voltage, so that the voltages between the respective phase clusters 130, 132, and 134 can make balance.

In summary, when a specific cell included in the second phase cluster 132 is faulty, a voltage of each of (n+2) cells a1 to a(n+2) and c1 to c(n+2) included in the respective first and third phase clusters 130 and 134 may be controlled to be smaller than a preset voltage. The maximum value, i.e., the peak value of the AC voltage, which can be generated by (n+1) cells b1 to b(n+1) included in the second phase cluster 132 may be generated using the (n+2) cells a1 to a(n+2) and c1 to c(n+2) included in the respective first and third phase clusters 130 and 134, which the voltage controlled as described above. Here, the preset voltage may be the first voltage of each of the (n+2) cells a1 to a(n+2) and c1 to c(n+2) included in the respective first and third phase clusters 130 and 134 at the normal time.

A voltage drop width with respect to how much the voltage of each of the (n+2) cells a1 to a(n+2) and c1 to c(n+2) included in the respective first and third phase clusters 130 and 134 is decreased when a cell in the second phase cluster 132 is faulty may be determined based on how many cells included in the second phase cluster 132 are faulty. For example, as a larger number of cells included in the second phase cluster 132 are faulty, the voltage of each of the (n+2) cells included in each of the first and third phase clusters 130 and 134 may become smaller.

As described above, in the disclosure, when a cell in a specific cluster is faulty, the voltage of a cell in a phase cluster, of which fault does not occur, is adjusted, so that voltage balance between the respective phase clusters can be maintained, thereby improving the reliability of a product.

Further, in the disclosure, the voltage of a cell in a phase cluster, of which fault does not occur, is controlled to be further decreased, so that switching loss of the corresponding cell can be reduced, thereby extending the lifespan of the corresponding phase cluster.

Hereinafter, a method for controlling the reactive power compensation apparatus 100 configured as described above will be described.

Figure 7:
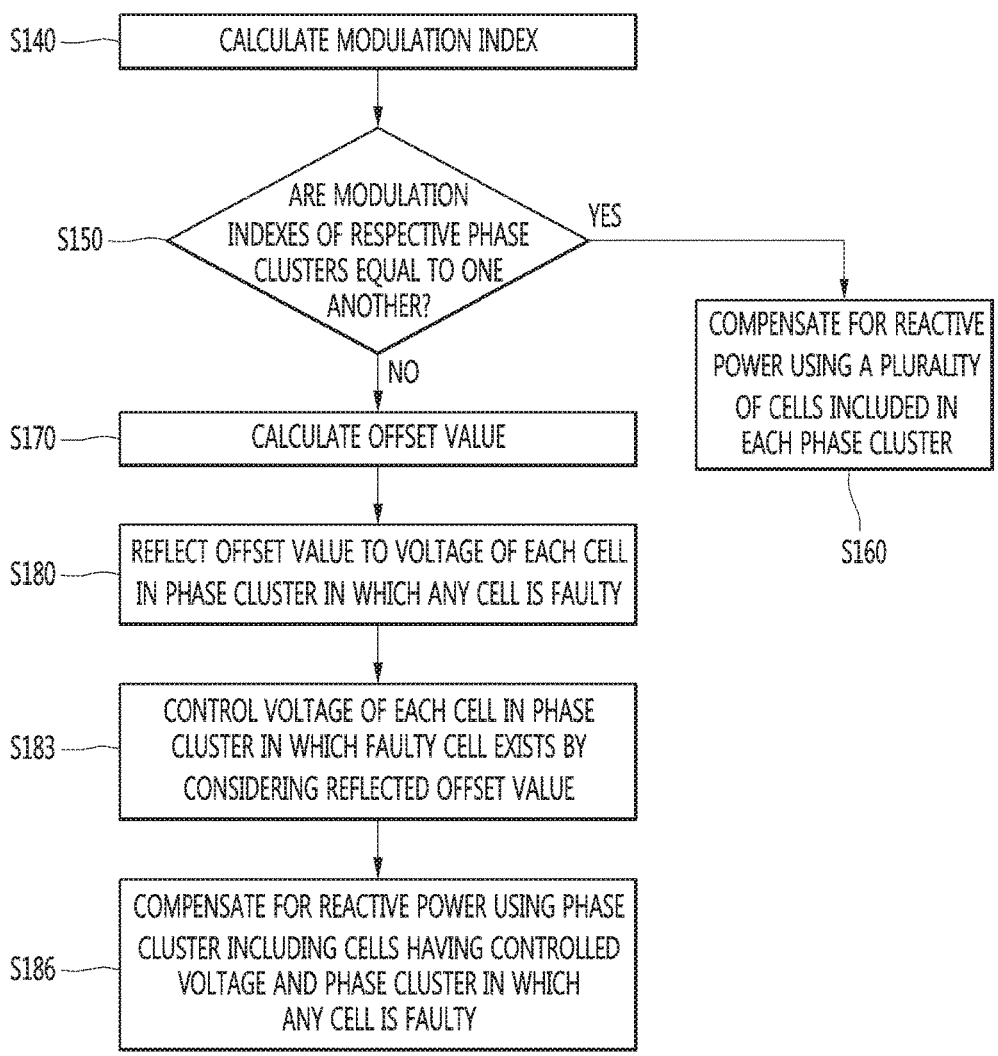
FIG. 7 is a flowchart illustrating a control method of the reactive power compensation apparatus according to an embodiment.

FIG. 7 is a flowchart illustrating a control method of the reactive power compensation apparatus according to an embodiment.

Referring to FIGS. 4 and 7, the controller 110, specifically, the upper controller 113 may calculate a modulation index (S140).

The modulation index may be calculated by considering a number of cells of which fault occurs among the cells a1 to a(n+2), b1 to b(n+2), or c1 to c(n+2) included in each phase cluster 130, 132, or 134.

Figure 8:
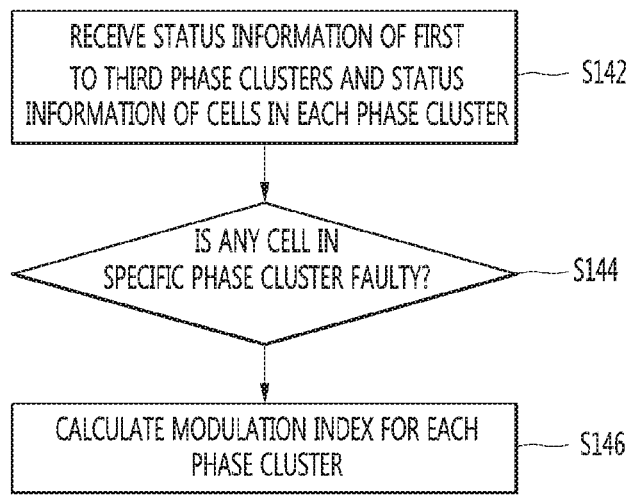
FIG. 8 is a flowchart illustrating in detail S140 of FIG. 7.

As shown in FIG. 8, the upper controller 113 may receive, from the first to third phase clusters 130, 132, and 134, status information of the respective first to third phase clusters 130, 132, and 134 and status information of the respective cells a1 to a(n+2), b1 to b(n+2) or c1 to c(n+2) of each phase cluster 130, 132, or 134 (S142).

The upper controller 113 may check whether any cell in a specific phase cluster has been faulty, based on the status information of the respective first to third phase clusters 130, 132, and 134 and the status information of the respective cells a1 to a(n+2), b1 to b(n+2) or c1 to c(n+2) of each phase cluster 130, 132, or 134 (S144).

The upper controller 113 may calculate a modulation index for each phase cluster 130, 132, or 134, based on whether any cell in the specific phase cluster has been faulty (S146).

The modulation index may be calculated by Equation 2.

For example, it is assumed that the total number Ncell of cells per each phase cluster 130, 132, or 134 is 10, the number of spare cells is 2, the maximum voltage of each cell is 1V, and the peak value of an AC voltage is 8V.

In this case, when two cells among the cells b1 to b10 of the second phase cluster 132 are faulty, the modulation index may be calculated as shown in the following Table 1.

TABLE 1

| Modulation index | Modulation index |
|---|---|
| MIa | 8/10 = 0.8 |
| MIb | 8/8 = 1 |
| MIc | 8/10 = 0.8 |

Referring back to FIG. 7, if modulation indexes of the respective phase clusters 130, 132, and 134 are calculated, the upper controller 113 may determine whether the modulation indexes of the respective phase clusters 130, 132, and 134 are equal to one another (S150).

If the modulation indexes of the respective phase clusters 130, 132, and 134 are equal to one another (MIa=MIb=MIc), reactive power of the power system may be compensated for using a plurality of the cells a1 to a(n+2), b1 to b(n+2), or c1 to c(n+2) included in each phase cluster 130, 132, or 134.

That is, when the modulation indexes of the respective phase clusters 130, 132, and 134 are equal to one another, the upper controller 113 may generate a cluster voltage balancing control signal, i.e., a reference signal, based on a sum of voltages of the cells a1 to a(n+2), b1 to b(n+2), or c1 to c(n+2) included in each phase cluster 130, 132, or 134. In addition, the lower controller 116 may generate a cell voltage balancing control signal in each phase cluster 130, 132, or 134 under control of the upper controller 113.

The control signal generator 119 may generate a command value and/or a control signal, based on the cluster voltage balancing control signal and the first to third cell voltage balancing control signals. The command value and/or the control signal may be transmitted to the first to third phase cluster controllers 120, 122, and 124, so that first to third switching signals for the first to third phase clusters 130, 132, and 134 are generated by the first to third phase cluster controllers 120, 122, and 124, respectively.

Therefore, the cells in each phase cluster 130, 132, or 134 may be switched according to the first to third switching signals, so that the reactive power of the power system can be compensated for (S160).

Meanwhile, when the modulation indexes of the respective phase clusters 130, 132, and 134 are not equal to one another, the upper controller 113 may calculate an offset value of each of the cells a1 to a(n+2), b1 to b(n+2), or c1 to c(n+2) for each phase cluster 130, 132, or 134 (S170).

Figure 9:
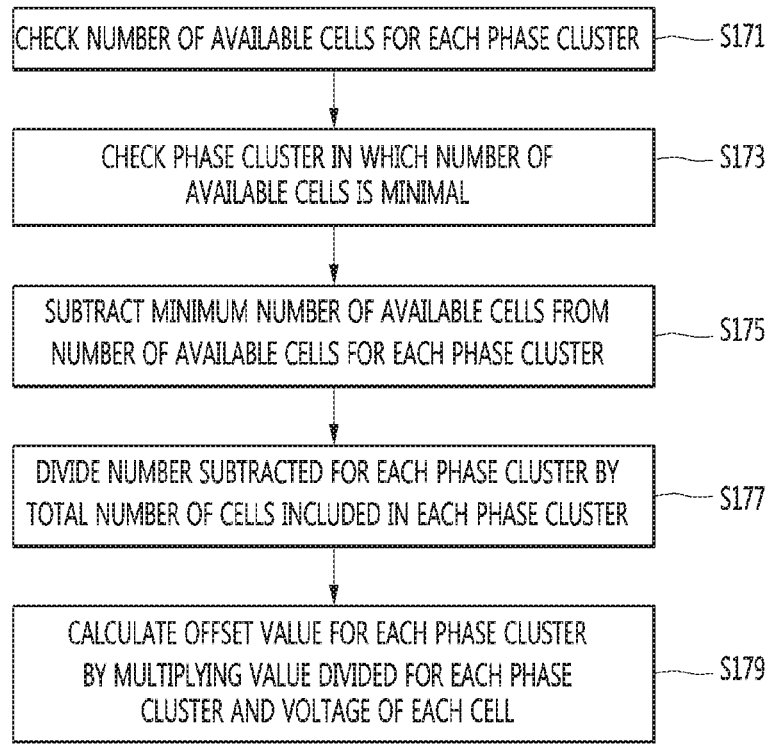
FIG. 9 is a flowchart illustrating in detail S170 of FIG. 7.

As shown in FIG. 9, the upper controller 113 may check a number of available cells for each phase cluster 130, 132, or 134 (S171).

Here, the available cell may be defined as an available cell of which fault does not occur. Referring to Table 1, since any cell is not faulty in the first phase cluster 130 and the third phase cluster 134, 10 cells a1 to a10 or c1 to c10 are all available cells in each of the first phase cluster 130 and the third phase cluster 134.

On the other hand, since two cells among the cells b1 to b(n+2) included in the second phase cluster 132 are faulty, 8 cells in the second phase cluster 132 are available cells, and two cells in the second phase cluster 132 are unavailable cells.

After the number of available cells is checked, the upper controller 113 may check a phase cluster in which the number of available cells is minimal (S173).

Therefore, the second phase cluster 132 may be the phase cluster in which the number of available cells is minimal. In this case, the minimum number of available cells may be 8.

The upper controller 113 may subtract the minimum number of available cells from a number of available cells for each phase cluster 130, 132, or 134 (S175).

Therefore, 10−8=2 in each of the first phase cluster 130 and the third phase cluster 134 may be, and 8−8=0 in the second phase cluster 132.

The upper controller 113 may divide the subtracted result by a total number of the cells included in each phase cluster 130, 132, or 134 (S177).

Therefore, 2/10=0.2 in each of the first phase cluster 130 and the third phase cluster 132, and 0/10=0 in the second phase cluster 132.

The upper controller 113 may calculate an offset value for each phase cluster 130, 132, or 134 by multiplying the divided result and a voltage of each cell (S179).

Therefore, an offset value of 0.2*1=0.2V may be calculated in each of the first phase cluster 130 and the third phase cluster 134, and an offset value of O*1=0V may be calculated in the second phase cluster 132.

Referring back to FIG. 7, the upper controller 113 may transmit the calculated offset value to the lower controller 116.

The lower controller 116 may reflect the offset value to a voltage of each cell in a phase cluster in which any cell is not faulty (S180).

As a result of the reflection, the lower controller 116 may adjust the voltage of each cell included in each of the first phase cluster 130 and the third phase cluster 134 as a voltage value obtained by subtracting the offset value from the cell voltage of the phase cluster in which any cell is not faulty, e.g., each of the first phase cluster 130 and the third phase cluster 134.

For example, since the offset value of each of the first phase cluster 130 and the third phase cluster 134 is 0.2V, the voltage of the cells of the respective first phase cluster 130 and the third phase cluster 134 may be adjusted as 1V−0.2V=0.8V. Since the offset value of a phase cluster in which a cell is faulty, i.e., the second phase cluster 132 is 0, the voltage of the cells of the second phase cluster 132 may be maintained as the existing voltage value, i.e., 1V.

The lower controller 116 may generate first and third cell balancing control signals of the respective first to third phase clusters 130 and 134, based on the controlled voltage of each cell, i.e., 0.8V. The lower controller 116 may generate a second cell balancing control signal of the second phase cluster 132, based on the existing voltage value, i.e., 1V.

Meanwhile, the lower controller 116 may calculate energy of each phase cluster 130, 132, or 134, which is used for the upper controller 113 to generate the cluster balancing control signal, i.e., the reference signal, and transmit the calculated energy to the upper controller 113.

Average power may be represented by the following Equation 3.

$$P_{ave} = \Sigma (Vcell[i] + Voffset)^2 \qquad \text{Equation 3}$$

$P_{ave}$ denotes energy that is average power of each phase cluster 130, 132, or 134, Vcell denotes a voltage of each cell, and Voffset denotes an offset value.

The upper controller 113 may generate the reference signal, based on the energy of each phase cluster 130, 132, or 134, transmitted from the lower controller 116.

At this time, since the offset value becomes 0 in the second phase cluster 132, energy of the second phase cluster 132 is equal to that before the cell is faulty in the second phase cluster 132.

On the other hand, since the offset value of 0.2V exists in each of the first phase cluster 130 and the third phase cluster 134, energy of each of the first phase cluster 130 and the third phase cluster 134 is greater than that before the cell is faulty in the second phase cluster 132.

As the energy of each of the first phase cluster 130 and the third phase cluster 134 increases, the upper controller 113 may generate the reference signal, based on such an increment of the energy.

Accordingly, when a cell is faulty in a specific cluster, e.g., the second phase cluster 132, an offset value may be calculated using the modulation index, and the voltage of each of the cells a1 to a(n+2) or c1 to c(n+2) of each of the first phase cluster 130 and the third phase cluster 134 may be adjusted to be further decreased by considering the offset value (S183).

The control signal generator 119 may generate a command value and/or a control signal, based on the first to third cell balancing control signals transmitted from the lower controller 116 and the cluster balancing control signal, i.e., the reference signal transmitted from the upper controller 113, and transmit the generated command value and/or control signal to the first to third phase cluster controllers 120, 122, and 124. The first to third phase cluster controllers 120, 122, and 124 may generate first to third switching signals, based on the command value and/or control signal transmitted from the controller 110, and transmit the first to third switching signals to the respective first to third clusters 130, 132, and 134. The first to third clusters 130, 132, and 134 may be switching-controlled by the first to third switching signals, respectively.

In summary, after the voltage of each cell of the phase cluster in which any cell is not faulty is adjusted to be further decreased by considering the offset value, the voltage of each cell of the phase cluster in which the cell is faulty is maintained as it is, the reactive power of the power system may be compensated for through switching control of the first to third phase clusters 130, 132, and 134 according to the command value and/or control signal generated based on the voltages controlled as described above (S186).

The foregoing embodiments are merely exemplary and are not to be considered as limiting the disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the disclosure may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A reactive power compensation apparatus associated with a power system to compensate for reactive power of the power system, the reactive power compensation apparatus comprising:
   one or more phase clusters each comprising a plurality of cells; and
   a controller configured to control the one or more phase clusters,
   wherein, when at least one cell in a specific phase cluster among the one or more phase clusters is faulty, the controller controls a voltage of each cell in each of the remaining phase clusters except for the specific phase cluster to be adjusted, using a modulation index.

2. The reactive power compensation apparatus of claim 1, wherein the modulation index is calculated by the following equation:

$$MI = Vac/Vdc,$$

wherein MI denotes a modulation index, Vac denotes a peak voltage operable in the reactive power compensation apparatus, and Vdc denotes a sum of voltages of available cells among the cells included in the one or more phase clusters.

3. The reactive power compensation apparatus of claim 2, wherein the plurality of cells include n cells and spare cells, the n cells being capable of generating the peak voltage operable in the reactive power compensation apparatus and the spare cells provided by considering that cell are to be faulty.

4. The reactive power compensation apparatus of claim 3, wherein, although cells are faulty as many as the number of the spare cells, the controller controls voltage balance between the one or more phase clusters to be maintained.

5. The reactive power compensation apparatus of claim 1, wherein the controller calculates modulation indexes of the respective one or more phase clusters, and, when the calculated modulation indexes are equal, controls the reactive power of the power system to be compensated for, using the cells included in the one or more phase clusters.

6. The reactive power compensation apparatus of claim 5, wherein, when the calculated modulation indexes are not equal, the controller calculates an offset value for each of the one or more phase clusters, and reflects the calculated offset value to the voltage of each cell of each of the remaining phase clusters.

7. The reactive power compensation apparatus of claim 6, wherein the controller subtracts the offset value calculated for each of the one or more phase clusters from the voltage of each cell of each of the one or more phase clusters.

8. The reactive power compensation apparatus of claim 6, wherein the controller determines a phase cluster in which a number of available cells is minimal based on the number of available cells of the respective one or more phase clusters, and calculates an offset value for each of the one or more phase clusters, based on the minimum number of cells of the determined phase cluster.

9. The reactive power compensation apparatus of claim 8, wherein the controller:
subtracts the minimum number of cells of the determined phase cluster from the number of available cells in each of the one or more phase clusters;
divides the subtracted result by a total number of the cells included in each of the one or more phase clusters; and
calculates an offset value in each of the one or more phase clusters by multiplying the divided result and the voltage of each cell.

10. The reactive power compensation apparatus of claim 6, wherein the controller controls the voltage of each cell of each of the remaining phase clusters to be decreased, using the calculated offset value.

11. The reactive power compensation apparatus of claim 10, wherein the controller generates a reference signal for controlling the one or more phase clusters, using the calculated offset value.

12. The reactive power compensation apparatus of claim 11, wherein the controller generates a control signal, based on the reference signal,
wherein the controller further includes first to third phase cluster controllers that respectively generate first to third switching signals for controlling the respective one or more phase clusters, based on the control signal.

13. A method for controlling a reactive power compensation apparatus associated with a power system to compensate for reactive power of the power system, the method comprising:
when at least one cell in a specific phase cluster among one or more phase clusters is faulty, controlling a voltage of each cell in each of the remaining phase clusters except for the specific phase cluster to be adjusted, using a modulation index, the one or more phase clusters each comprising a plurality of cells; and
generating a control signal for controlling the one or more phase clusters, using the voltage of each cell in the specific phase cluster and the adjusted voltage of each cell in each of the remaining clusters.

14. The method of claim 13, wherein the plurality of cells include n cells and spare cells, the n cells capable of generating the peak voltage operable in the reactive power compensation apparatus and the spare cells provided by considering that cell are to be faulty.

15. The method of claim 14, further comprising, although cells are faulty as many as the number of the spare cells, controlling voltage balance between the one or more phase clusters to be maintained.

16. The method of claim 13, further comprising:
calculating modulation indexes of the respective one or more phase clusters; and
when the calculated modulation indexes are equal, controlling the reactive power of the power system to be compensated for, using the cells included in the one or more phase clusters.

17. The method of claim 16, further comprising:
when the calculated modulation indexes are not equal, determining a phase cluster in which a number of available cells is minimal based on the number of available cells of the respective one or more phase clusters;
calculating an offset value for each of the one or more phase clusters, based on the minimum number of cells of the determined phase cluster; and
controlling the voltage of each cell of each of the remaining phase clusters to be decreased, using the calculated offset value.

18. The method of claim 17, wherein the calculating of the offset value includes:
subtracting the minimum number of cells of the determined phase cluster from the number of available cells in each of the one or more phase clusters;
dividing the subtracted result by a total number of the cells included in each of the one or more phase clusters; and
calculating an offset value in each of the one or more phase clusters by multiplying the divided result and the voltage of each cell.

19. The method of claim 17, further comprising generating a reference signal for controlling the one or more phase clusters, using the calculated offset value.

20. The method of claim 19, further comprising:
generating the control signal, based on the reference signal; and
generating first to third switching signals for controlling the respective one or more phase clusters, based on the control signal.

* * * * *